United States Patent [19]

Niho

[11] Patent Number: 5,200,754
[45] Date of Patent: Apr. 6, 1993

[54] FOURTH-ORDER-PRODUCT PHASE DIFFERENCE AUTOFOCUS

[75] Inventor: Yoji G. Niho, Rancho Palos Verdes, Calif.

[73] Assignee: Hughes Aircraft Company, Los Angeles, Calif.

[21] Appl. No.: 799,505

[22] Filed: Nov. 27, 1991

[51] Int. Cl.$^5$ .............................................. G01S 13/90
[52] U.S. Cl. .................................................. 342/25
[58] Field of Search ........................................ 342/25

[56] References Cited

U.S. PATENT DOCUMENTS

| | | | |
|---|---|---|---|
| 4,924,229 | 5/1990 | Eichel et al. | 342/25 |
| 4,999,635 | 3/1991 | Niho | 342/25 |
| 5,021,789 | 6/1991 | Shaw | 342/25 |

*Primary Examiner*—T. H. Tubbesing
*Attorney, Agent, or Firm*—L. A. Alkov; W. K. Denson-Low

[57] ABSTRACT

The present invention is a computational method, defined by a computational algorithm, that automatically corrects synthetic array radar (SAR) focus errors more accurately than conventional procedures. The novel feature is that the present method estimates residual phase errors by forming fourth-order subarray products in lieu of conventional second-order subarray products. As a result, a pull-in range for residual phase errors is vastly improved. The present invention advances the state of the art by creating a SAR autofocus method that has an unlimited pull-in range for both a quadratic and a cubic phase errors. The invention thus extends the operational range and resolution of SAR systems, and enables the effective use of the SAR sensor with a limited (less expensive) motion compensation subsystem. The present invention provides for a phase difference autofocus method that estimates the residual quadratic and cubic phase error that often requires only one autofocus iteration.

7 Claims, 2 Drawing Sheets

FOURTH-ORDER-PRODUCT PHASE DIFFERENCE AUTOFOCUS

BACKGROUND

The present invention relates generally to synthetic array radar (SAR) autofocus processing techniques, and more particularly, to a phase difference autofocus method that is adapted to compensate for quadratic and cubic phase errors.

SAR resolution and the utility of its imagery heavily depends upon an ability to accurately estimate a residual phase error from the range compressed video phase history (VPH) data of a SAR data. In a typical autofocus method, a residual phase error is assumed to be accurately representable by a polynomial, and the autofocus processing is normally designed to estimate the coefficients of that polynomial. Many autofocus methods, however, have a limited pull-in range. The pull-in range is that point wherein the ability to estimate phase error begins to break down if the amount of a phase error becomes too excessive.

With reference to U.S. patent application Ser. No. 07/798,783, filed Nov. 27, 1991, for "Multiple Discrete Autofocus," assigned to the assignee of the present invention, it has been found that it is highly desirable to estimate and compensate for quadratic and cubic phase errors from the range compressed VPH data before applying a multiple discrete autofocus method. In the multiple discrete autofocus method, residual quadratic phase error is removed from the video phase history data before it is bandpass filtered. This is normally achieved by the use of a phase difference autofocus method that has been shown to be very effective in estimating the amount of quadratic phase error.

One method that has a virtually unlimited pull-in range for a quadratic phase error is a phase difference autofocus method. This method that is described in U.S. Pat. No. 4,999,635, for "Phase Difference Autofocusing for Synthetic Aperture Radar Imaging," assigned to the assignee of the present invention. This method has been shown to be very effective in accurately estimating the amount of residual quadratic phase error in range compressed VPH data. This high performance is primarily due to the fact that any quadratic phase error resident in a full array is essentially cancelled out when two subarrays are multiplied to form a second-order-product subarray.

For quadratic phase error estimation, at least two subarrays are required to form at least one second-order-product subarray. For a cubic phase error estimation, at least three subarrays are needed to form two second-order-product subarrays. The implementation of the second-order-product phase difference autofocus method is described in the above-cited patent application.

However, it has been determined that the performance of phase error estimation degrades as the amount of cubic phase error in a full array increases. This is caused by the fact that second-order-product subarrays still contain quadratic phase errors, which adversely affect the ability to detect the location of the proper peak in FFT filter processing. In such a situation, more than one autofocus iteration is normally required to accurately estimate the amount of phase errors.

SUMMARY OF THE INVENTION

The present invention comprises a computational method, defined by a computational algorithm, that automatically corrects synthetic array radar (SAR) focus phase errors more accurately than a conventional phase difference autofocus procedure. The novel feature is that the method of the present invention estimates residual phase errors by forming fourth-order subarray products in lieu of conventional second-order subarray products. As a result, pull-in range for residual phase errors is vastly improved.

The present invention advances the state of the art by providing a SAR autofocus method that has an unlimited pull-in range for both quadratic and cubic phase errors. The invention extends the operational range and resolution of SAR systems. The invention enables the effective use of a SAR sensor with a limited (less expensive) motion compensation subsystem. Thus, the present invention provides for a new phase difference autofocus method for estimating the residual quadratic and cubic phase error that typically requires only one autofocus iteration.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
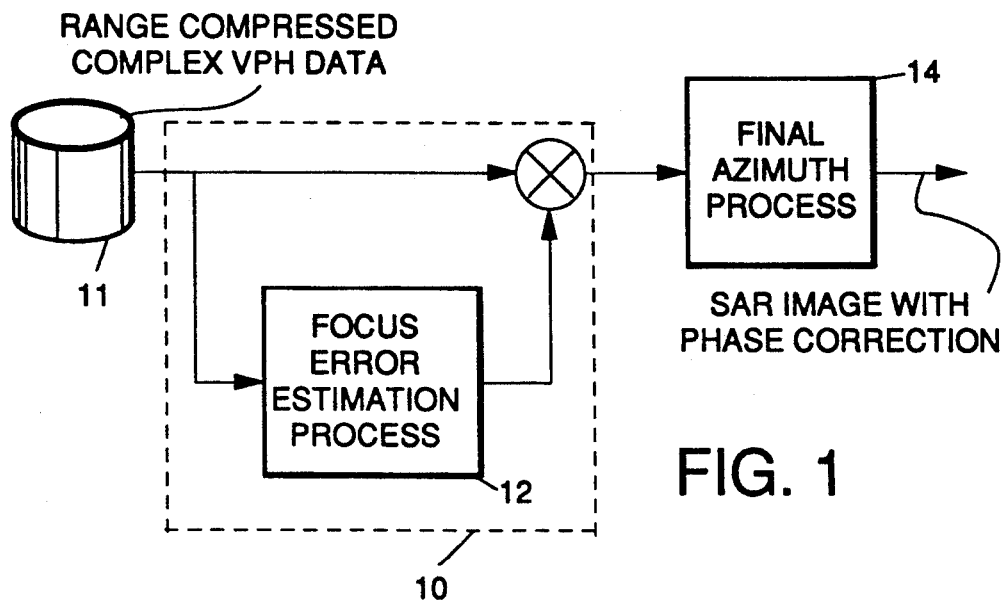
FIG. 1 illustrates an autofocus processing arrangement for use with a synthetic array radar processor that is conventional for most autofocus techniques.

The present invention comprises an autofocus process 10 that is employed with a synthetic array radar processor. The autofocus process 10 is designed for operation as indicated in FIG. 1. FIG. 1 illustrates an autofocus processing arrangement that is conventional for most autofocus techniques. However, the details in the implementation of the present process are different from conventional phase difference autofocus processes and processing techniques, as will be more fully described below. FIG. 1 shows a storage means 11 that stores input data for the autofocus process 10. The input data is range compressed video phase history (VPH) data of a SAR data that is to be processed. The range compressed VPH input data is coupled to a focus error estimation process 12 whose output comprises the estimated phase error contained in the range compressed VPH data. The range compressed VPH data is multiplied with the complex conjugate of the phasor having the estimated focus phase error as its phase in a mulitplier 13, thereby removing the focus phase error. A final azimuth process 14 operates on the phase-error-free range compressed VPH data and produces a focused SAR image.

The unique aspects of the present autofocus process is in the focus error estimation process 12. This focus error estimation process 12 is explained in detail with reference to FIGS. 2 and 3.

The range compressed VPH data is processed by the focus error estimate process 12, and the output thereof is a phase error correction signal $e^{-j\phi(m)}$ where $\phi(m)$ is given by the equation:

$$\phi(m) = 2\pi\{\Phi_q (m/M)^2 + \Phi_c (m/M)^3\}, \quad -M < m < M$$

where $\Phi_q$ and $\Phi_c$ represent the estimated quadratic and the cubic phase errors, respectively. The range compressed VPH data is multiplied by $e^{-j\phi(m)}$ in the multiplier 13. The final azimuth process 14 operates on the VPH data with phase error removed and produces a focused SAR image.

The present invention comprises a fourth-order-product phase difference autofocus method for estimating the residual quadratic and cubic phase error that typically requires only one autofocus iteration. The following is a derivation of the present fourth-order-product phase difference equations forming the computational algorithm.

Let $\phi(t)$, $-T/2 \leq t \leq T/2$, denote the phase variation over one synthetic array of length T. Then, without loss of any generality, let there be an odd number of data points (2M+1) that are uniformly sampled over the interval T. Let the full array be denoted by:

$$S(m) = \sigma e^{j\phi(m)}, \quad -M < m < M$$

where $\sigma$ denotes the magnitude and $\phi(m)$ the phase. Let the phase variation $\phi(m)$ has the form:

$$\phi(m) = 2\pi(A + Bm + Cm^2 + Dm^3), \quad -M \leq m \leq M,$$

for some (unknown) constants A, B, C and D. It is then desired to find the quadratic and cubic phase errors $$2\pi CM^2 \text{ and } 2\pi DM^3,$$

respectively, or equivalently the coefficients C and D. The preferred way to characterize the phase function is to represent it in terms of a Legendre polynomial. However, the phase function is represented in terms of a Taylor series for simplicity. Results can be easily converted to the Legendre polynomial representation.

Figure 2:
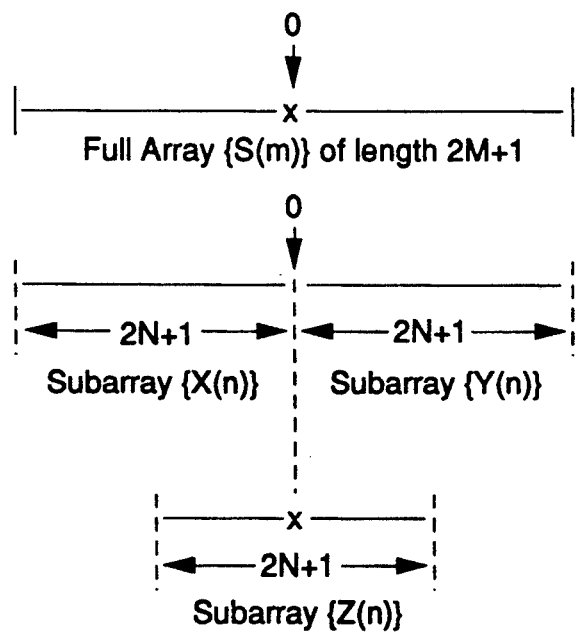
FIG. 2 illustrates the formation of subarrays used in processing range compressed VPH data in accordance with the principles of the present invention.

Given a full array $\{S(m)\}$ of length 2M+1, three subarrays are formed, $\{X(n)\}$, $\{Y(n)\}$ and $\{Z(n)\}$ of length 2N+1 with their subarray centers located at $m = -L$, $m = L$, and $m = 0$, respectively, as shown in FIG. 2.

In FIG. 2, the three subarrays are shown to be overlapped 2:1, but they need not be overlapped. The three subarrays are given by:

$$X(n) = S(n-L) = \sigma e^{j\phi(n-L)}, \quad -N < n < N$$

$$Y(n) = S(n+L) = \sigma e^{j\phi(n+L)}, \quad -N < n < N$$

$$Z(n) = S(n) = \sigma e^{j\phi(n)}, \quad -N < n < N.$$

Mixing (multiplying) two subarrays after taking complex conjugates of one subarray, two second-order-product subarrays are formed. These comprise complex conjugating $X(n)$ and multiplying $X^*(n)$ and $Z(n)$, and conjugating $Z(n)$ and multiplying $Z^*(n)$ and $Y(n)$. This results in:

$$P(n) = X^*(n)Z(n)$$
$$= \sigma^2 e^{-j\phi(n-L)} e^{j\phi(n)}$$
$$= \sigma^2 e^{j2\pi(2CL - 3DL^2)n} e^{j6\pi DLn^2}$$

and $$Q(n) = Z^*(n)Y(n)$$
$$= \sigma^2 e^{-j\phi(n)} e^{j\phi(n+L)}$$
$$= \sigma^2 e^{j2\pi(2CL + 3DL^2)n} e^{j6\pi DLn^2}$$

In the above expressions, constant phase terms are disregarded since they do not affect the location of the peak response during subsequent FFT processing. Instead of directly processing the second-order-product subarrays $\{P(n)\}$ and $\{Q(n)\}$ using an FFT, fourth-order-product subarrays $\{G(n)\}$ and $\{H(n)\}$ are formed as follows and are subsequently FFT processed. $\{G(n)\}$ and $\{H(n)\}$ are given by:

$$G(n) = P(n) Q^*(-n), \quad -N \leq n \leq N$$

and $$H(n) = P^*(n) Q(n), \quad -N \leq n \leq N.$$

The expressions for fourth-order-product subarrays simplify to:

$$G(n) = \sigma^4 e^{+j2\pi 4CLn}$$

and $$H(n) = \sigma^4 e^{+j2\pi 6DL^2 n}$$

The quadratic and cubic terms C and D are now decoupled. If an FFT is performed on $\{G(n)\}$ and $\{H(n)\}$, its linear phase term determines the filter that will respond. If a K-point FFT is performed on $G(n)$, its peak response is located at $$\tau_g = 4CLK.$$

Similarly, a K-point FFT performed on $\{H(n)\}$ produces a peak response at $$\tau_h = 6DL^2 K.$$

The locations of the peak response, $\tau_g$ and $\tau_h$, are determined within a fraction of an FFT filter width by interpolating between the filters having the maximum responses. Solving for the desired unknown values C and D:

$$C = \tau_g/(4LK)$$

and $$D = \tau_h/(6L^2 K).$$

Equivalently the center-to-end quadratic phase error $\Phi_q$ (in a Taylor series sense) is given by:

$$\Phi_q = 2\pi CM^2 = 2\pi \tau_g M^2/(4LK).$$

and the center-to-end cubic phase error $\Phi_c$ (in a Taylor series sense) is given by:

$$\Phi_c = 2\pi DM^3 = 2\pi \tau_h M^3/(6L^2 K).$$

Figure 3:
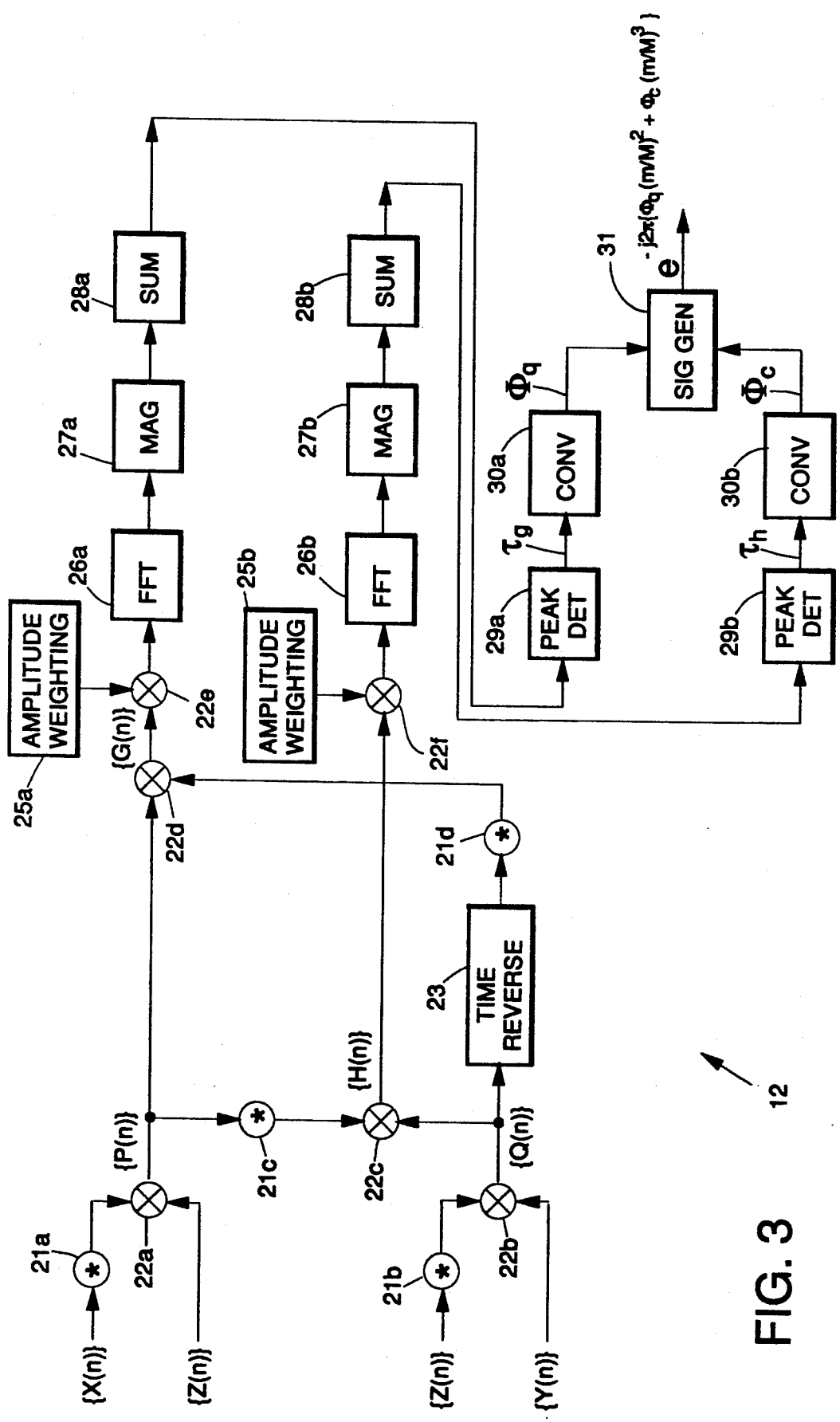
FIG. 3 illustrates a fourth-order-product phase difference autofocus processing methodology for estimating quadratic and cubic phase errors in accordance with the present invention.

FIG. 3 illustrates a fourth-order-product phase difference autofocus process 12 for estimating quadratic and cubic phase errors using the fourth-order-product subarrays in accordance with the present invention. First, second and third subarrays {X(n)}, {Y(n)}, {Z(n)} are processed as follows. The first subarray {X(n)} is complex-conjugate multiplied together with the third subarray {Z(n)} using a conjugator 21a and a multiplier 22a to produce a first second-order-product subarray {P(n)}. Similarly, the third subarray {Z(n)} is complex-conjugate multiplied together with the second subarray {Y(n)} using a conjugator 21b and a multiplier 22b to produce a second second-order-product subarray {Q(n)}.

The first second-order-product subarray {P(n)} is complex-conjugate multiplied together with {Q(n)} using a conjugator 21c and a multiplier 22c to produce a first fourth-order-product subarray {H(n)}. The second second-order-product subarray {Q(n)} is time reversed and complex-conjugate multiplied together with {P(n)} using time reversal 23, conjugator 21d, and a fourth multiplier 22d to produce a second fourth-order-product subarray {G(n)}. The respective first and second fourth-order-product subarrays {G(n)} and {H(n)} are then processed in a substantially identical manner as follows.

Amplitude weighting coefficients are respectively combined with {G(n)} and {H(n)} using amplitude weighting 25a, 25b, and fifth and sixth multipliers 22e, 22f. Then K-point FFTs are performed on amplitude-weighted {G(n)} and {H(n)} in FFTs 26a, 26b to produce respective FFT filter banks. Thereafter, the respective FFT filters from the FFTs 26a, 26b are magnitude-detected in magnitude detectors 27a, 27b to form respective autofocus functionals.

These processing steps are repeated over all range bins from the range compressed VPH data. Autofocus functionals are summed over all range bins by summations 28a, 28b. The respective locations of the peak responses of the autofocus functionals are proportional to the quadratic and cubic phase errors. The respective locations, $\tau_g$ and $\tau_h$, of the peak responses are determined by interpolating (or scaling) between the filters having the maximum response values using interpolators 29a, 29b. Thereafter, peak location values $\tau_g$ and $\tau_h$ are converted to the quadratic and cubic phase error values $\Phi_q$ and $\Phi_c$ in convert 30a, 30b using the above-cited equations. Finally the phase error correction signal is generated using $\Phi_q$ and $\Phi_c$ in signal generator 31.

More specifically, and as shown in FIG. 3, {G(n)} and {H(n)} are weighted by the amplitude weighting function in the amplitude weighting 25a, 25b prior to the FFTs 26a, 26b to suppress sidelobe responses. The amplitude weighting function is real and symmetric, and hence it does not change the location of the peak response of the FFTs. The detected outputs of the FFTs 26a, 26b are then averaged over all range bins under consideration to reduce the effect of noise on estimation. The estimate is heavily weighted by those range bins having scatterers with high radar cross sections.

Experiments were performed using Advanced Synthetic Array Radar System (ASARS) data, and the results are as follows. The present fourth-order-product phase difference autofocus process 12 using the fourth-order-product subarrays {G(n)}, {H(n)} was implemented on VAX 11/780 and FPS AP164 computers and has been tested with ASARS high resolution spotlight image data. The phase errors estimated by the second-order-product phase difference method described in U.S. Pat. No. 4,999,635 cited above and the fourth-order-product phase difference autofocus process 12 of the present invention were compared.

Though the test was quite limited in scope, it shows that both methods perform equally well in estimating quadratic phase error if the actual residual cubic phase error is not excessive. If, on the other hand, there exists a large amount of cubic phase error, the second-order-product method requires several iterations of autofocus to find the proper quadratic and cubic phase errors, whereas the fourth-order-product autofocus process requires only one iteration to obtain both the quadratic and cubic phase errors.

In view of the above, it should be clear that the present fourth-order-product phase difference autofocus process and the implementation of this new method shown in FIG. 3 may be used to estimate quadratic and cubic phase errors in a SAR system. The quadratic and cubic phase error generated by the present invention may be determined quite accurately with only one autofocus iteration.

Thus there has been described a new and improved fourth-order-product phase difference autofocus computational method. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A phase difference autofocus computational method for use in processing range compressed video phase history (VPH) data of a SAR data to correct for phase errors contained therein, said method comprising the steps of:

dividing an array of range compressed VPH data into first and second subarrays;

forming a third subarray of range compressed VPH data comprising a portion of the array;

complex-conjugate multiplying the first subarray with the third subarray to produce a first second-order-product subarray;

complex-conjugate multiplying the third subarray with the second subarray to produce a second second-order-product subarray;

complex-conjugate multiplying the first second-order-product subarray with the second second-order-product subarray to produce a first fourth-order-product subarray;

time reversing and complex-conjugate multiplying the second second-order-product subarray with the first second-order-product subarray to produce a second fourth-order-product subarray;

separately performing Fourier transforms on the first and second fourth-order-product subarrays to produce respective FFT filter banks;

separately performing magnitude-detections on respective FFT filter banks to produce respective autofocus functionals;

summing the respective autofocus functionals over all range bins;

respectively determining the locations of the peak response values of the autofocus functionals;

computing quadratic and cubic phase error values from the respective peak response locations;

combining the quadratic and cubic phase error values in accordance with a predefined relationship to produce a phase error correction signal; and multiplying the range compressed VPH data with the phase error correction signal to produce phase-corrected VPH data.

2. The method of claim 1 wherein:

the array of data is divided into first and second equal subarrays comprising respective halves of the array; and the third subarray comprises a center portion of the array.

3. The method of claim 2 which further comprises the step of:

separately amplitude weighting the first and second fourth-order-product subarrays prior to performing the Fourier transforms on them.

4. A phase difference autofocus computational method for use in processing range compressed video phase history (VPH) data of a SAR data to correct for phase errors contained therein, said method comprising the steps of:

dividing an array of range compressed VPH data into first and second equal subarrays that comprise respective halves of the data comprising the array;

forming a third subarray of range compressed VPH data comprising a center portion of the array, and which comprises the same amount of data as the first and second subarrays;

complex-conjugate multiplying the first subarray with the third array to produce a first second-order-product subarray;

complex-conjugate multiplying the third subarray with the second array to produce a second second-order-product subarray;

complex-conjugate multiplying the first second-order-product subarray with the second second-order-product subarray to produce a first fourth-order-product subarray;

time reversing and complex-conjugate multiplying the second second-order-product subarray with the first second-order-product subarray to produce a second fourth-order-product subarray;

separately performing Fourier transforms on the first and second fourth-order-product subarrays to produce respective FFT filter banks;

separately performing magnitude-detections on respective FFT filter banks to produce respective autofocus functionals;

summing the respective autofocus functionals over all range bins;

respectively determining the locations of the peak response values of the autofocus functionals;

computing quadratic and cubic phase error values from the respective peak response locations;

combining the quadratic and cubic phase error values in accordance with a predefined relationship to produce a phase error correction signal; and multiplying the range compressed VPH data with the phase error correction signal to produce phase-corrected VPH data.

5. The method of claim 4 which further comprises the step of:

separately amplitude weighting the first and second fourth-order-product subarrays prior to performing the Fourier transforms on them.

6. A phase difference autofocus computational method for use in processing range compressed video phase history (VPH) data of a SAR data to correct for phase errors contained therein, said method comprising the steps of:

dividing an array of range compressed VPH data into first and second equal subarrays $\{X(n)\}$, $\{Y(n)\}$;

forming a third subarray $\{Z(n)\}$ of range compressed VPH data comprising a center portion of the array;

complex-conjugate multiplying the first subarray $\{X(n)\}$ with the third subarray $\{Z(n)\}$ to produce a first second-order-product subarray $\{P(n)\}$;

complex-conjugate multiplying the third subarray $\{Z(n)\}$ with the second subarray $\{Y(n)\}$ to produce a second second-order-product subarray $\{Q(n)\}$;

complex-conjugate multiplying the first second-order-product subarray $\{P(n)\}$ with the second second-order-product subarray $\{Q(n)\}$ to produce a first fourth-order-product subarray $\{H(n)\}$;

time reversing and complex-conjugate multiplying the second second-order-product subarray $\{Q(n)\}$ with the first second-order-product subarray $\{P(n)\}$ to produce a second fourth-order-product subarray $\{G(n)\}$;

separately amplitude weighting the first and second fourth-order-product subarrays $\{G(n)\}$, $\{H(n)\}$;

separately performing Fourier transforms on the amplitude weighted first and second fourth-order-product subarrays $\{G(n)\}$, $\{H(n)\}$ to produce respective FFT filter banks;

separately performing magnitude-detections on respective FFT filter banks to produce respective autofocus functionals;

summing the respective autofocus functionals over all range bins;

respectively determining the locations of the peak response values of the autofocus functionals;

computing quadratic and cubic phase error values from the respective peak response locations;

combining the quadratic and cubic phase error values in accordance with a predefined relationship to produce a phase error correction signal; and multiplying the range compressed VPH data with the phase error correction signal to produce phase-corrected VPH data.

7. The method of claim 6 wherein:

the dividing an array into first and second subarrays and forming a third subarray comprises creating first, second and third subarrays of length $2N+1$ defined by $$X(n) = S(n-L) = \sigma e^{j\phi(n-L)}, \quad -N < n < N,$$

$$Y(n) = S(n+L) = \sigma e^{j\phi(n+L)}, \quad -N < n < N, \text{ and}$$

$$Z(n) = S(n) = \sigma e^{j\phi(n)}, \quad -N < n < N,$$

and wherein a full array of length $2M+1$ is defined by $$S(m) = \sigma e^{j\phi(m)}, \quad -M < m < M,$$

defines the locations of the first and second subarrays, $\sigma$ is a magnitude and $\phi(m)$ is a phase variation having the form $$\phi(m) = 2\pi (A + Bm + Cm^2 + Dm^3), \quad -M \leq m \leq M,$$

for constants A, B, C and D;

the complex conjugate multiplying the first subarray $\{X(n)\}$ with the third subarray $\{Z(n)\}$ to produce a first second-order-product subarray $\{P(n)\}$ is defined by $P(n)=X^*(n)\,Z(n)$ and the complex-conjugate multiplying the third subarray $\{Z(n)\}$ with the second subarray $\{Y(n)\}$ to produce a second second-order-product subarray $\{Q(n)\}$ is defined by $Q(n)=Z^*(n)\,Y(n)$;

the separately amplitude weighting the first and second fourth-order-product subarrays $\{G(n)\}$ and $\{H(n)\}$ are defined by $$G(n)=P(n)Q^*(-n),\ -N\leq n\leq N, \text{ and}$$

$$H(n)=P^*(n)\,Q(n),\ -N\leq n\leq N,$$

and are predetermined as $$G(n)=\sigma^4 e^{+j2\pi 4CLn}, \text{ and}$$

$$H(n)=\sigma^4 e^{+j2\pi 6DL^2 n};$$

respectively determining the locations of the autofocus functional is determined by:
the peak response is located at $\tau_g=4CLK$ if a K-point FFT is performed on the first fourth-order-product subarray $\{G(n)\}$, and
the peak response is located at $\tau_h=6DL^2K$ if a K-point FFT is performed on the second fourth-order-product subarray $\{H(n)\}$; and
the computing the quadratic and cubic phase error values in accordance with a predefined relationship to produce a phase error correction signal is specified as center-to-end quadratic phase error $\Phi_q$ is given by $\Phi_q=2\pi\tau_g M^2/(4LK)$, and the center-to-end cubic phase error $\Phi_c$ is given by $\Phi_c=2\pi\tau_g M^3/(6LK)$.

* * * * *